United States Patent [19]
Cardwell et al.

[11] Patent Number: 6,019,862
[45] Date of Patent: Feb. 1, 2000

[54] METHOD OF MAKING INTEGRATED TOILET BOWL EXHAUST SYSTEM

[75] Inventors: Troy Cardwell, Cottage Grove; Scott Cardwell, Eugene, both of Oreg.

[73] Assignee: Better Lifestyles, Inc., Eugene, Oreg.

[21] Appl. No.: 09/173,512

[22] Filed: Oct. 15, 1998

Related U.S. Application Data

[63] Continuation-in-part of application No. 09/124,648, Jul. 29, 1998, which is a continuation-in-part of application No. 08/745,253, Nov. 8, 1996, abandoned, which is a continuation of application No. 08/422,136, Apr. 13, 1995, abandoned.

[51] Int. Cl.$^7$ ...................................................... C04B 37/00
[52] U.S. Cl. ...................... 156/62.2; 156/89.11; 264/629; 264/633
[58] Field of Search ............................... 156/62.2, 89.11; 264/629, 633

[56] References Cited

U.S. PATENT DOCUMENTS

| | | |
|---|---|---|
| 952,745 | 3/1910 | Kirk . |
| 1,109,313 | 9/1914 | Barnes . |
| 1,289,151 | 12/1918 | Gavin . |
| 1,435,644 | 11/1922 | Kelly . |

*Primary Examiner*—Christopher A. Fiorilla
*Attorney, Agent, or Firm*—Klarquist Sparkman Campbell Leigh & Whinston, LLP

[57] ABSTRACT

The toilet includes a bowl section and two superposed rim sections for conveying fresh water to the bowl though the lower rim section and air from the bowl through the upper rim section. The lower rim section has an integral water plenum having an upper wall and a lower wall, the lower wall of the plenum having an upstanding rim engaging said upper wall in support the same during firing of the clay slip from which the rim section is cast. The upper rim section defines an integral air collection chamber having a lower wall and an upper wall and an upstanding rib extending upwardly from said lower wall to engage the lower surface of the upper wall. The separate sections are cast in plaster of Paris molds having the configuration of the exterior surface of the respective sections. The liquid clay slip is placed into the respective molds and the slips permitted to harden a predetermined mount inwardly from the respective molds by withdrawal of moisture from the slip into the plaster of Paris mold, leaving the central portion of the clay slip liquid which is then poured out of the mold, whereafter the sections are permitted to dry to sufficient rigidity that the molds can be removed therefrom. After removal of the sections, they are assembled in their position in a completed toilet and the assembled sections fired to effect bonding of the sections together.

1 Claim, 4 Drawing Sheets

METHOD OF MAKING INTEGRATED TOILET BOWL EXHAUST SYSTEM

This application is a continuation-in-part of application Ser. No. 09/124,648, filed Jul. 29, 1998, which is a continuation-in-part of application Ser. No. 08/745,253, filed Nov. 8, 1996, abandoned, which is a continuation of application Ser. No. 08/422,136, filed Apr. 13, 1995, abandoned.

FIELD OF THE INVENTION

The present invention relates to an air exhaust system which is integral to a toilet stool, which is part of either a conventional toilet water flushing system utilizing a toilet stool and water tank (typically mounted on the toilet stool) or an industrial water flushing system which does not require a water tank as part of the flushing system and the method of manufacturing same. The air exhaust system functions independently of the water flushing system within the toilet stool for either system. More particularly, the water flow system and the air exhaust system are common to the toilet stool structure, but do not utilize common conduits or components. Moreover, the entire air exhaust system is structurally and functionally distinct and independent from the water tank and the toilet seat.

BACKGROUND OF THE INVENTION

Noxious or offensive odors in rooms that house conventional or industrial toilet systems or functional equivalents thereof is an age-old problem. Building codes frequently require rooms in which toilets are housed to have an exhaust system to remove moisture from the room, but these systems are terribly inadequate when it comes to removing odors. Typically, exhaust systems consist of a vent in the ceiling with a fan to generate air flow out of the room. These systems are neither efficient nor effective. Ceiling vents/fans are removing odors far from the source of the odors, rendering these systems both ineffective as odor removal systems, and inefficient, in regards to their energy consumption. Additionally, most of the air removed is not offensive, and frequently the air removed by the system is air heated (or often cooled) by the building's HVAC system, and therefore the removal thereof is a waste of energy. These fans also need to operate long after use to remove what odors they can. Typically, the fan is often left operating long after odors have drifted into other rooms in the building and is no longer removing odors, thereby wasting additional energy. In some industrial (public) bathrooms, fans are continuously running. Retrofitting an exhaust system onto or into a conventional toilet flushing system to solve these problems and more efficiently remove odors has been the common design solution/improvement to the ineffective and inefficient ceiling vent/fan system, however, these retrofitted systems have inherent drawbacks. They must be fitted to existing toilet systems, which can significantly vary in size and design, and typically require assorted gadgetry to accomplish the "retrofit." They are also ineffective, often inefficient, and cumbersome, unsightly, and costly.

The prior art is replete with retrofitted air exhaust systems which can be divided into two convenient categories of design solutions which are retrofitted to a conventional toilet (water flushing) system, and in the later category, which can also be retrofitted to an industrial toilet system. The systems falling under the first category utilize the conduits, ducts, and apertures in the toilet stool, which in the conventional design delivers the water from the water tank into the conduit, through the ducts and out the apertures within the toilet stool, and into the toilet bowl, as a path for odor/air removal from the toilet bowl; the direction of air flow is in the opposite direction of the water flow. These designs typically utilize the water tank, in one manner or another, as a functional conduit of sorts to remove air from the toilet bowl and eventually from the room which houses the toilet. The second category requires a special toilet seat or special and often elaborate modifications to the existing toilet seat in one way or another to draw the foul air out of the toilet bowl. These designs are equally applicable to a residential-type water stool -water tank system and the industrial toilets, which do not have a water tank. Neither category of design solution previously disclosed, regardless of the specifics, has seen wide spread use nor significant commercial success, and for good reason; these designs are ineffective, inefficient, unsightly, cumbersome, and costly.

Myriad problems are inevitable when the air exhaust system and water flushing systems share the same apertures, ducts, conduits, and other components, as described in the first category above. Typically, these systems are apt to interfere with the function of the other, thereby rendering each less than fully functional and with inevitable complications. For example, because the flush ring apertures within the toilet bowl, and the ducts/conduits in the toilet stool leading thereto, which disperse the water into the toilet bowl when the water flushing system is in operation, are also the intake apertures for the air exhaust system, the two systems cannot function simultaneously. These systems would require a mechanism to keep the mechanical water flushing system from operating at the same time as the electromechanical air exhaust system. It is preferable to have an air exhaust system which can be fully operational during the water flushing operation, though it is not mandatory; the flushing operation consisting of the flow of the water into, around, and out of the toilet bowl and then through the water trap in the base of the toilet stool and eventually into the sewer/septic system. Even when the systems are not operating concurrently, due to the location and orientations of the flush ring apertures, water and other liquids and potentially solids will invariably get into, and possibly sucked into, the apertures and conduits when the air flow/removal system is operating, thereby interfering with the proper operation of potentially both systems.

In addition to these inherent problems, many retrofitted air exhaust system designs require elaborate mechanical, air flow, and sometimes electrical systems to operate; these systems are bulky, do not blend with the existing toilet system, are often cumbersome, and tend to be expensive. Most of these designs draw the odors through the water tank, which frequently necessitates the elaborate sub systems (mechanical, air flow, and electrical) to reside within the water tank or at least a portion thereof. There is an economy of space within water tanks to begin with; therefore, it would be exceedingly difficult to install the retrofitted air exhaust system, and even more difficult to service either the retrofitted exhaust system or the conventional flush system components within the water tank. These components within the water tank are the only components that typically require servicing or replacement, so easy access thereto is imperative. Another disadvantage to this design is that it will only work with the conventional toilet design, which includes a water tank. An example of this type of design is disclosed in U.S. Pat. No. 5,029,346, which includes, among other modifications to the existing water delivery system, a complicated dual damper system to regulate air flow out of the toilet bowl and through the water tank, which also must be sealed. The system disclosed in U.S. Pat. 5,321,856 is another example of the elaborate, awkward, burdensome, and costly designs which are typical of systems which must be retrofitted to the water tank.

Some of the previous design solutions do not utilize the existing water delivery system in the flush ring to remove air from the toilet bowl but rely on a pipe or manifold or a similar device located within or at the inner periphery of the toilet bowl as the air intake source; U.S. Pat. 4,175,293 is illustrative. While these designs tend not to directly interfere with the water delivery system to the toilet bowl, the waste and water in the toilet bowl can easily interfere with the proper functioning of the air intake source and consequently the entire air exhaust system. Moreover, these devices, such as a pipe or a manifold, are located within the toilet bowl and therefore are prone to getting soiled from common use. These designs will interfere with the clean, clear, contained, and unobstructed discharge into the toilet bowl. The bolder designs that locate the air intake source well within the toilet bowl or are made of malleable materials (to facilitate locating the device within the toilet bowl) could interfere with the swirling action of the flushing/swirling water into and around the toilet bowl, which promotes cleaning and proper drainage/flushing of the water down the trap. Malleable systems also run the risk of being bent or moved into a more obstructing/interfering position. Conventional hand, or similar, cleaning of the toilet bowl would also be obstructed and therefore more difficult, time consuming, and incomplete. These designs fall into the second category of retrofitted systems described above because these systems invariably require changes to be made to the toilet seat design (for either conventional or industrial toilets); locating the intake device within the toilet bowl requires alterations to the existing toilet seat and/or its mounting to the toilet stool or an entirely different, and specially designed and manufactured, toilet seat may be required—different seat designs may also require changes to be made to the toilet stool. Inconvenient and potentially costly retrofitted toilet seats are two more drawbacks of these designs, further flaws to the air exhaust systems which use the seat as an integral component or require seat modifications will be discussed below. As previously noted and discussed, the second category of design solutions to remove foul odors from a toilet bowl utilizes the toilet seat, in one way or another, as the air intake point (source) of the retro-fitted exhaust system. These designs also have drawbacks which render these systems inefficient, ineffectual and/or impractical, as well as cumbersome, unsightly and costly. These retrofitted designs all share one common disadvantage in that there is a plethora of toilet seats and flush ring designs currently on the market with varying shapes, dimensions, colors, materials, and specification. This severely limits the usefulness and marketability of many of these retrofitted seat exhaust systems, regardless of their level of performance. U.S. Pat. Nos. 4,402,091, 4,125,906 and 3,999,225 are examples of seat systems which require careful matching between the existing toilet and the retrofitted parts or entirely new toilet seats.

Many of the seat systems also require the toilet seat, or associated devices to be sealed to the top of the toilet stool and the bottom of the toilet seat—this is but one of many pieces of gadgetry typically required to retrofit existing toilets with an air exhaust system. The need for the seal is an indication of another design flaw common to many of the seat exhaust systems, as well as to design solutions which utilize the water tank but require a seal therewith. Sufficient and effective draw is critical to the proper functioning of these systems but is difficult to achieve with these designs because of the gap between the bottom of the toilet seat and the top of the stool or some other air gap in the water tank, so maintaining tight seals is critical to effective odor removal and minimizing odor drift away from the air intake source.

Many retrofitted designs which utilize the toilet seat, such as the one disclosed in U.S. Pat. No. 5,170,512, have serious design flaws in that the means for drawing air from the toilet bowl is inefficient, ineffective, and interfere with the operation of other toilet devices and systems, and/or is rather complex with elaborate design details and necessary gadgetry. U.S. Pat. 5,170,512 is demonstrative; therein is disclosed a retrofitted toilet seat which draws air from the toilet bowl, however, the distance between the seat apertures and the toilet bowl, in addition to the air gap between the seat and the top of the toilet stool, make this system a particularly inefficient air removal device. Additionally, the system disclosed in the U.S. Pat. No. 5,170,512 relies on the existing ceiling fan, which is often required to reduce the moisture content of the air in the bathroom, to draw the odors out of the toilet bowl via the retrofitted toilet seat. Not only would the odor removal function put an additional "draw load" on the system and thereby interfere with the moisture removal system and make efficient odor removal more difficult, but the extensive distance between the toilet bowl and the fan would also contribute to the inefficacy of the system; unless an extremely large, powerful and probably noisy fan was employed, there would not be enough draw to adequately remove the odors from the toilet bowl. Much of the prior art utilizes existing air ducts to remove the foul air—this is highly inadvisable because the air ducts and conduits may already be at maximum air carrying capacity, so additional flow into that system may cause both systems to back up.

Many of the toilet seat solutions attach the air intake device to the underside of the toilet seat. These designs share the same problem as those described above, including but not limited to: the air gap between the air intake and the toilet stool where the odors are concentrated; the difficulty in cleaning the existing toilet and the retrofitted parts; the structural and aesthetic compatibility problems between the toilet components and the retrofitted parts; and the necessary modifications to the toilet seat. The air gap will be of particular concern because it will contribute to the inefficiency of the system and therefore the effectiveness of the odor removal device. Many systems try to amend this problem with a specially "sealed" toilet seat, which may help, but does not solve the problem of the air intake source being above or outside the toilet bowl and further away from the source of odors than necessary.

Many of the prior art systems which retrofit components of the exhaust system to the seat also retrofit other components to the toilet stool and/or the water tank with the requisite complex integration of the exhaust system components with the toilet stool and/or water tank components. These designs require matching holes, sealing surfaces to moist porcelain, and/or drilling holes into the existing toilet fixtures. Additionally, these designs, as mentioned above, may interfere with and complicate the servicing and cleaning of the toilet stool-water tank system, and/or the bathroom floor plan or design. For the most part, these prior art design solutions are awkward, cumbersome, difficult to clean, and marginally functional.

There are also general design disadvantages common to most of these retrofitted systems which impact the replacement of toilet water flushing system components. Toilet stools and water tanks currently have modular designs to the extent that one is interchangeable with various designs/model/sizes of the other—there only being a flush hole for which the two pieces must be compatible. The flush hole in the toilet stool, typical of the conventional toilet design, transfers the water from the water tank to the toilet stool flush ring. Many of the retrofitted exhaust systems in the prior art require modification to both of these components. Therefore, replacing either the water tank or the toilet stool would require disassembling and reassembling at least a portion of the retrofitted system in order to replace the water tank, water tank components, or the toilet stool. Some of the prior art air exhaust systems locate many of the necessary retrofitted mechanical, air flow, and electrical components exterior to the water tank and toilet stool and do not have this problem. These designs, however, typically do not fit into the design plans for most bathrooms, are awkward and/or unsightly, and make servicing or cleaning the room and toilet water flushing system difficult. Additionally, these components may be awkwardly located and questionably secured to the existing toilet bowl, toilet stool, water tank, wall, or floor and are unwieldy, and typically violate various codes which must be complied with. Water and moisture in the bathroom make retrofitted electrical components within the water tank, on the bathroom floor, or thereby, inherently dangerous.

As just mentioned, another significant problem common to these retrofitted designs is code compliance. These designs may not meet building codes nor be in compliance with the Uniform Plumbing Code because of the location of the additional mechanical as well as electrical components.

SUMMARY OF THE INVENTION

Therefore, in light of the panoply of problems with prior art systems, it is an object of the present invention to provide an integral toilet exhaust system which efficiently and effectively removes odors from a toilet bowl. The integral design does not require retrofitted components or only a minimum thereof.

It is an additional object of the integral toilet exhaust system invention to share no functional components or conduits with the toilet water flush system, thereby allowing the exhaust system to function independently of the toilet flush system thereby enabling the two systems to operate simultaneously without interfering with the functionality of the other.

Yet another object of the invention is to integrate the air exhaust intake apertures and associated conduits into the toilet stool during the manufacturing process, thereby making the air exhaust system completely independent from the water tank, and economizing manufacturing costs.

Still another object of the subject invention is to provide a toilet bowl exhaust system with an economy of parts, which requires no additional mechanical or electrical devices or gadgets associated with the toilet stool or water tank, except for an electro-mechanical draw system which can be easily housed in a wall or other appropriate remote location.

Another object of the subject invention is to provide a toilet bowl exhaust system which is easy to install, clean, service, and maintain, which can also be readily incorporated into an existing room in an economy of space and easily adaptable to standard water tank or toilet seat designs, thereby facilitating the replacement of components.

A further object of the subject invention is to provide intake apertures which are designed, located, and directed so as to maximize the removal of odors from the toilet bowl while minimizing the volume of air necessary to remove the odors from the room, yet will be easy to clean and maintain, and will not easily be soiled from use.

An additional object of the invention is to provide an efficient system which requires little energy to function effectively and wastes little energy during the odor removal process.

Still another object of the invention is to provide an efficient air exhaust system which will meet the strictest energy efficiency standards and various codes and regulations.

Advantages and features of the invention are also in the simplicity of design and operation, economy of parts and low-cost method of mass production.

The invention will be more fully understood from the figures and detailed description which follow. The invention is defined in the claims appended at the end of the detailed description, but which are offered by way of example only and should in no way limit the breadth of the invention.

DETAILED DESCRIPTION OF THE PREFERRED EMBODIMENT

Referring now to the figures:

The toilet stool 10 has design features well known in the art including a base 12, base mounting bolts 14, only one of which is shown, a toilet bowl 16 having a semi-elliptical, planar top edge 17, a flush or water ring 18 including a semi-elliptical portion 19 seated on the edge 17. The water ring 18 is formed with water outlet apertures 20, water duct 22, and a water conduit or plenum 24 having a bottom wall 19 and a top wall 25 which defines water tank aperture 26 (see FIG. 6) located toward the back of toilet stool 10. The bottom wall 19 is formed with an upstanding rib 23 which supports the upper wall 25 during the manufacturing process. Toilet seat mounting apertures 38 are provided to receive seat mounting bolts to secure a toilet seat and lid 39 to the toilet stool. Water tank mounting apertures 40 are also provided. A typical industrial toilet design, which does not have a water tank and is well known in the art, of course would not require the water tank mounting apertures. It should be appreciated that the best mode toilet stool design described herein is for a conventional toilet design, which utilizes a water tank. Notwithstanding, the invention disclosed and claimed herein is equally applicable to conventional toilet designs which do not utilize a water tank.

Figure 6:
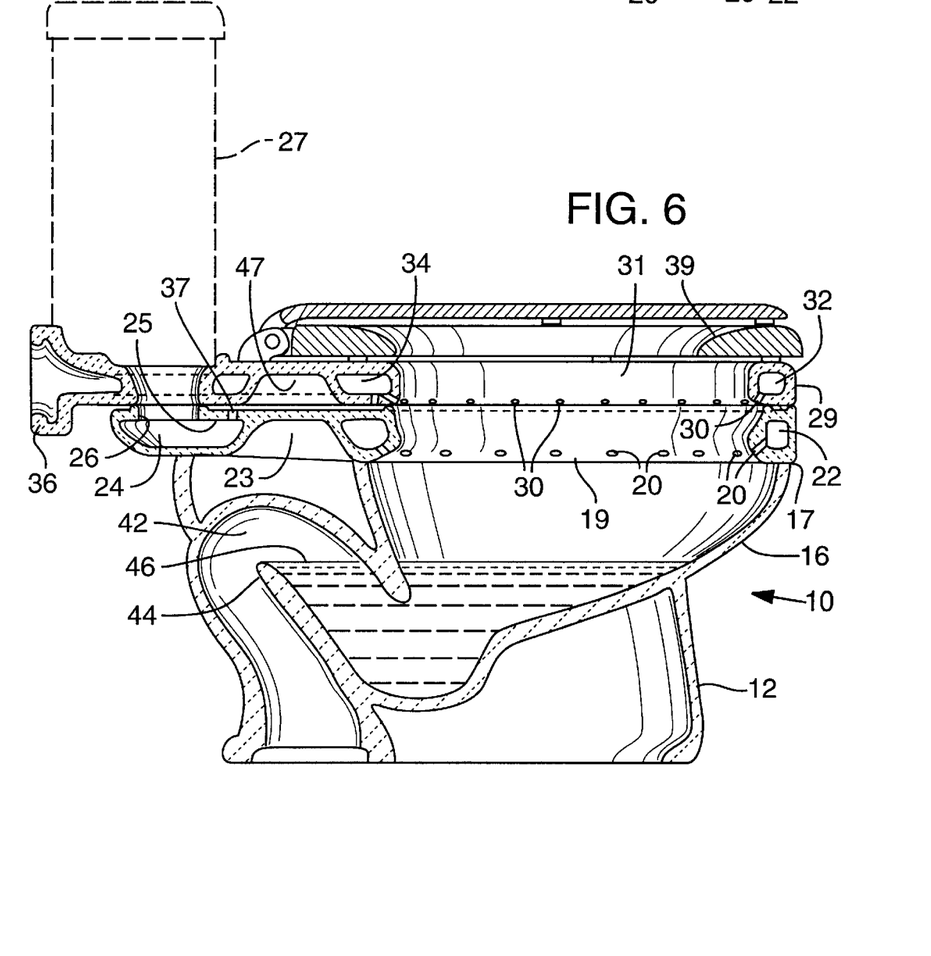
FIG. 6 is a sectional view of the toilet taken along line 6—6 of FIG. 3 with a water tank shown in dotted lines.

Typical of conventional toilet designs, the toilet stool 10 is designed to be coupled with a conventional water tank 27 (indicated in dotted lines in FIG. 6) via water conduit aperture 26. Referring to FIG. 6, when the water delivery system is "flushed" fresh water from the water tank passes through aperture 26, into water chamber 24, subsequently into water duct 22, and out outlet apertures 20 into toilet bowl 16. Alternatively, an industrial stool will get fresh water directly from a water line which is delivered to the water conduit via various plumbing devices, but which are functionally equivalent to water conduit aperture 26 in that a predetermined amount of water is delivered at a predetermined rate to the water plenum 24, water duct 22, and outlet apertures 20. Many industrial stools use the Sloan Valve Co. flushometer to deliver flushing water to the toilet-stool system. The fresh water flushed into the toilet bowl 16 raises the water level in the toilet bowl 16 and the water trap 42, which prior to flushing is approximately at the level 46. Water eventually breaches the vertical protrusion 44 in the trap 42 and drains down through an aperture in the bottom of the toilet stool and into a sewer/septic line; neither the bottom aperture nor the sewer line is shown, but both are well known in the art. As the water trap 42 is filled with water a siphon is created as water falls down the trap and into the sewer system and atmospheric pressure effectively pushes the water out of the toilet bowl 16 and completes the flushing action. Mechanical devices associated with the water tank, or alternatively the flushometer in the industrial toilet design, both of which are well known in the art but are not illustrated, refill the water tank, toilet bowl 16, and water trap 42, or alternatively for the industrial design just the toilet bowl 16 and water trap 42, to an appropriate level, preferably approximately at water level 46, thereby readying either system to be used again.

Referring to FIGS. 1–4, and 6 in accordance with the invention, positioned on the toilet above the water ring 18 is an air ring 29 including a semi-elliptical portion 31 coincident with the semi-elliptical portion 19 of the water ring and surrounding the toilet bowl 16 and defining an air duct 32 into which air within the bowl 16 may be drawn through openings 30. The duct 32 is connected to an integrally formed air exhaust conduit 34 having broad bottom and top walls 43, 45 respectively from which conduit air may be exhausted into the air exhaust system through a coupler 36. The bottom wall 43 is formed with an upwardly projecting rib 47 which engages the lower surface of the top wall 45 to support the latter during the manufacturing process. As may be seen in FIG. 2, the water ring is provided with an upwardly protruding rib 33 around the inner periphery of the semi-elliptical portion 19 of the water ring 18, and a further rib 35, which extends upwardly around the entire outer periphery of the water ring 18. The ribs 33, 35 are spaced from but are parallel to each other around the front and sides of the portion of the water ring which defines the central opening thereof. The bottom surface 41 of the semi-elliptical portion 31 of the air ring is substantially flat and is supported on the ribs 33, 35, the purpose of which will be explained subsequently.

Figure 7:
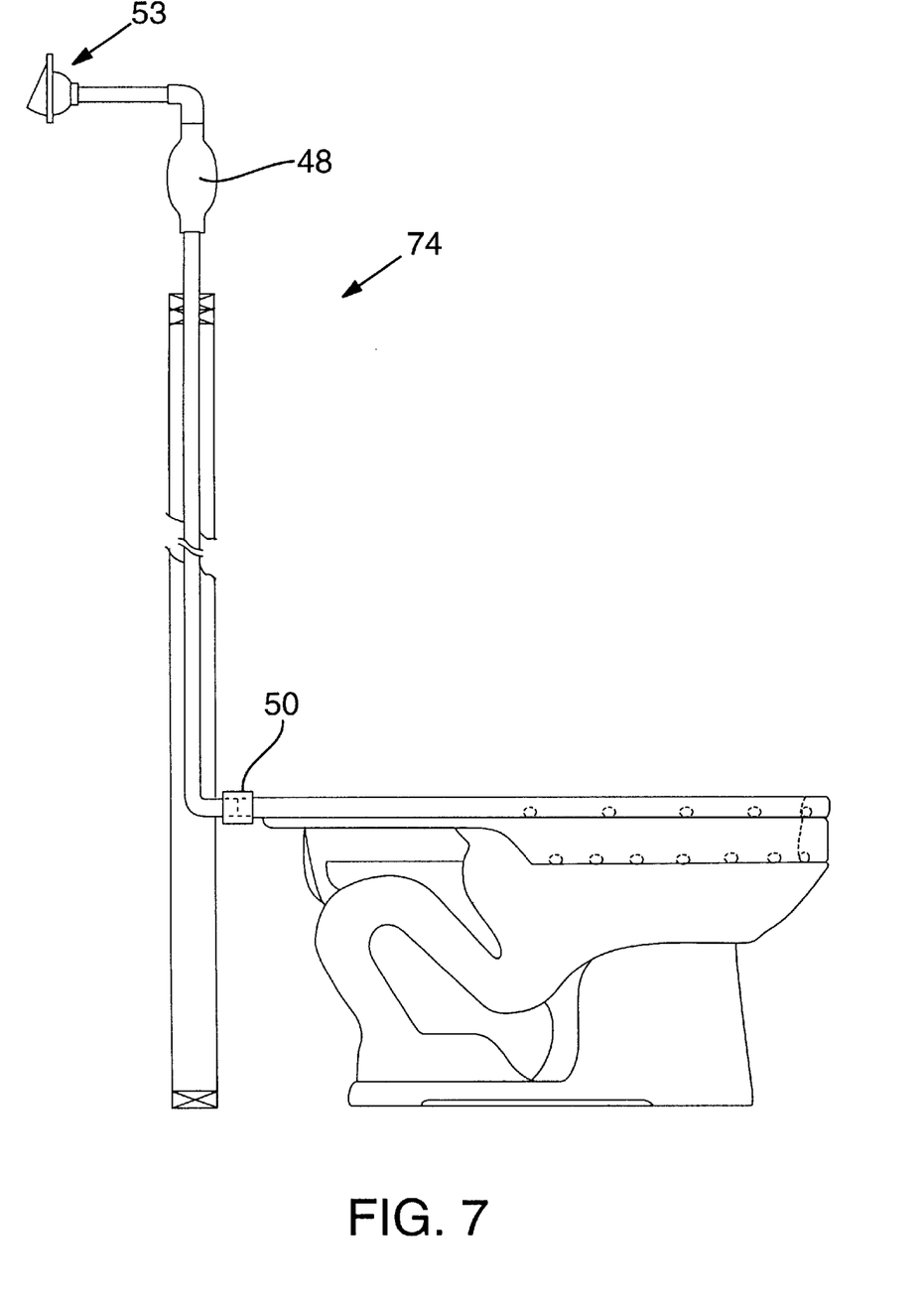
FIG. 7 is a fragmentary side view of the toilet of FIG. 1 showing the air exhaust conduits exterior to the toilet stool.

A suitable air exhaust system, which operates independently of the water delivery system, and comprises a negative pressure source, such as an in-line vacuum 48 (FIG. 7), is coupled to the toilet stool to draw air out of the toilet bowl 16. The in-line vacuum 48, which is typically off, can be activated at the appropriate time by a variety of means. The most preferred activation means would be a toilet seat activation switch similar to that described in U.S. Pat. No. 5,253,371, which is hereby incorporated by reference.

Figure 1:
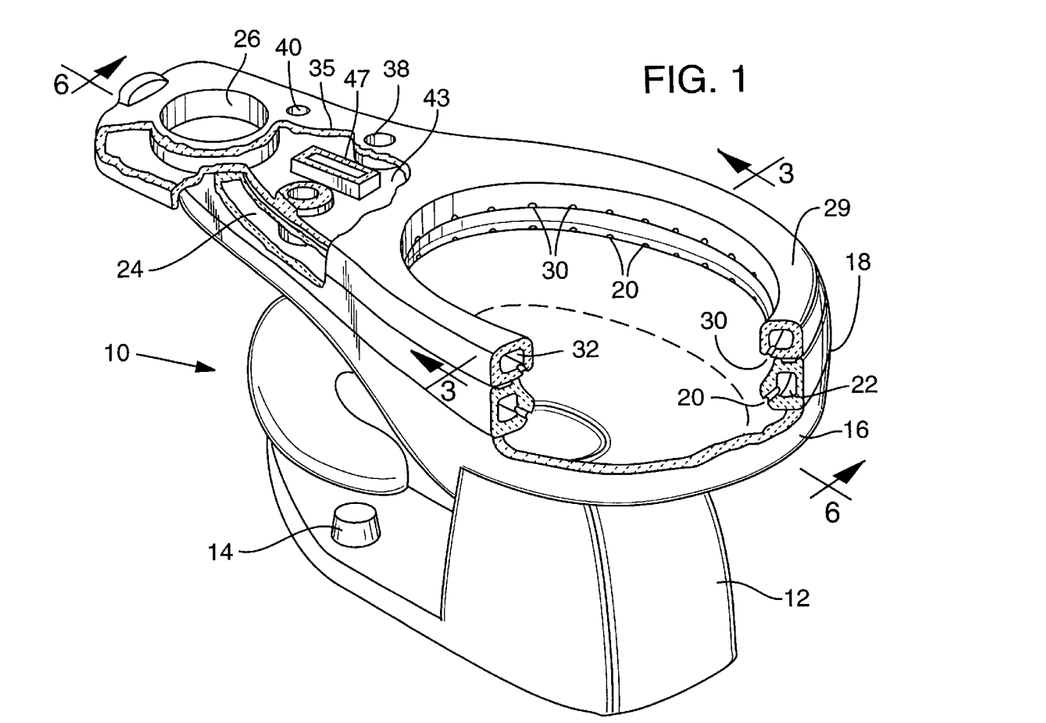
FIG. 1 is a perspective view of a toilet constructed in accordance with the invention broken away to show details thereof.
Figure 2:
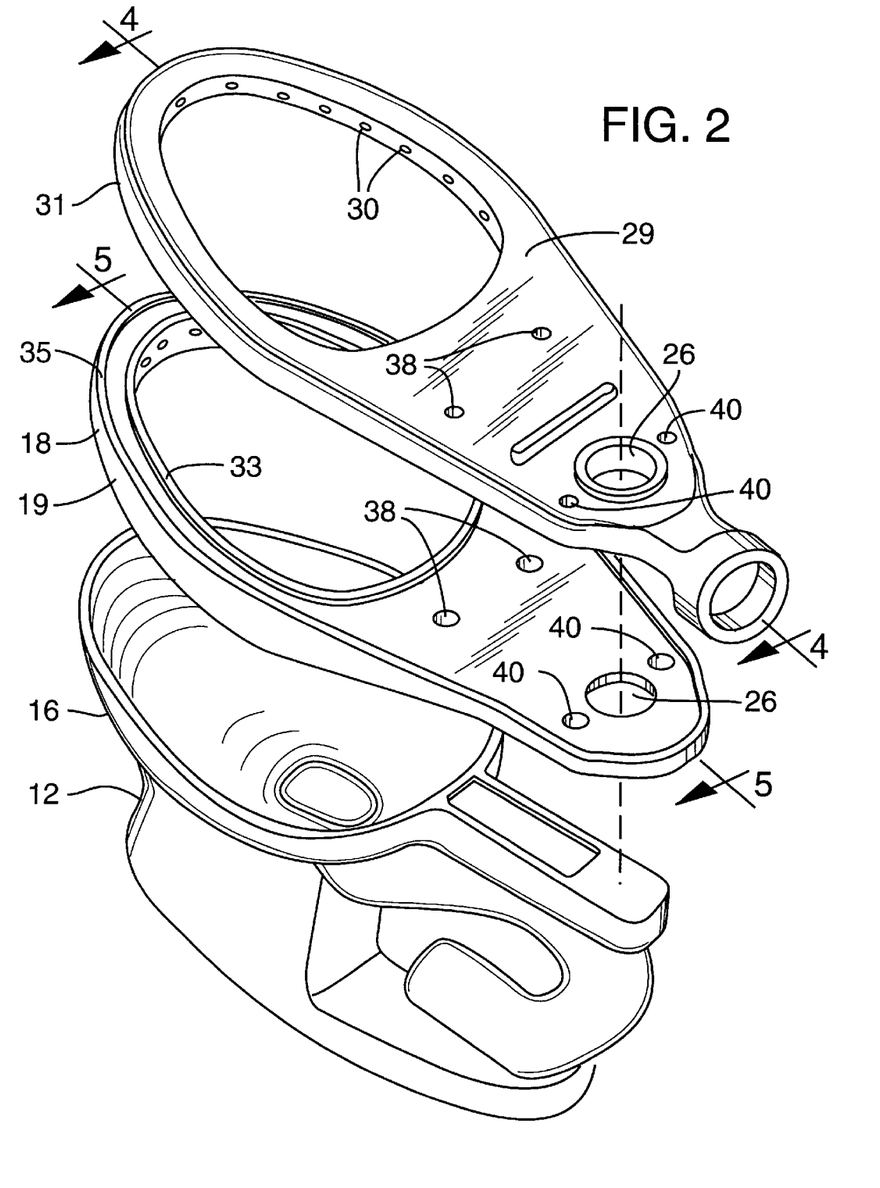
FIG. 2 is an exploded perspective view of the toilet of FIG. 1.
Figure 3:
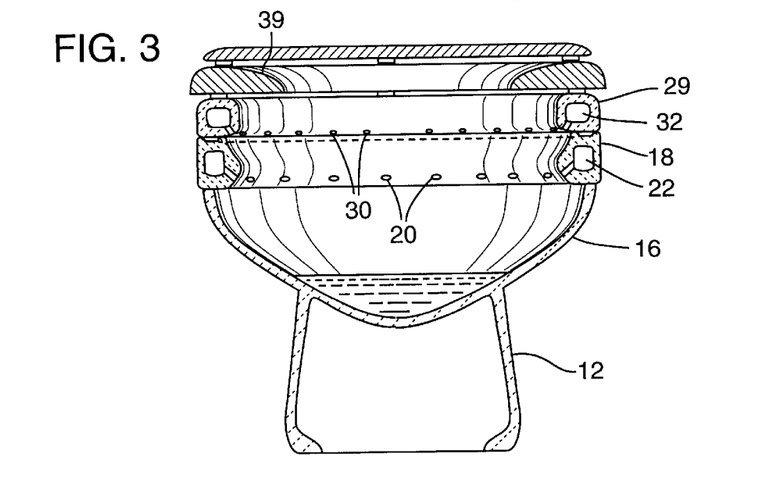
FIG. 3 is a sectional view taken along line 3—3 of FIG. 1 with the addition of a seat and cover.
Figure 4:
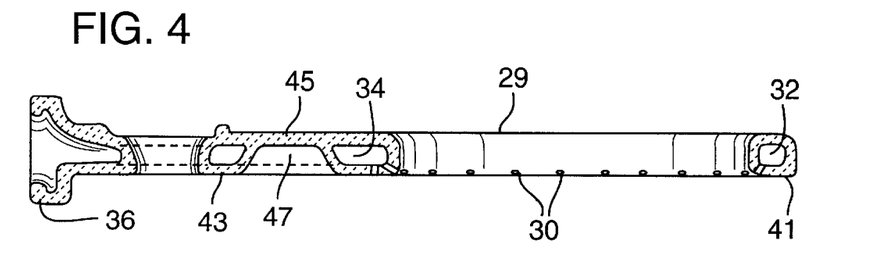
FIG. 4 is a sectional view of the air ring element taken along line 4—4 of FIG. 2.
Figure 5:
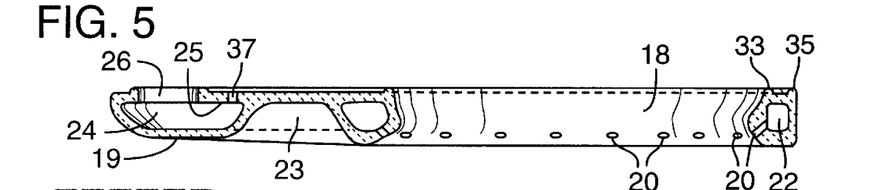
FIG. 5 is a sectional view of the water ring element taken along line 5—5 of FIG. 2.

The preferred embodiment of the toilet is manufactured in the following manner:

First, a sectional mold is made of plaster of Paris in which the base 12 and bowl section 16 of the toilet 10 may be cast of a suitable porcelain clay. Another plaster of Paris mold is made in which the water ring 18 may be cast, and still another mold is made of plaster of Paris, in which the air ring 29 may be cast. This latter mold will be provided with an aperture which will define the external periphery of the air exhaust coupler 36 on the air ring. Likewise, the mold for the water ring 18 will be provided with an aperture which will define the water conduit aperture 26 in the water ring. Each of these molds defines a cavity complementary to the desired surface configuration of the respective ring. The molds for the air and water ring each is formed in two sections with a horizontal parting line as the air ring and water ring are depicted in FIGS. 4 and 5.

After these molds are formed and assembled, a liquid porcelain clay slip is poured into the molds. In the case of the water ring the slip is poured into the mold through the portion which defines the opening 26 in the finished ring. The plaster of Paris mold will withdraw moisture from the slip contained in the mold whereby the slip will commence to harden progressively inwardly from the inner surface of the mold. The mold is allowed to set for a period of time sufficient that a peripheral portion of the slip of predetermined thickness is hardened sufficiently to maintain its configuration and the unhardened, still liquid center portion; of the clay slip is then removed by pouring it out of the opening 26. By this action the ring is left with a cavity that will define the water duct 22 and plenum 24. The cast ring is then permitted to dry and harden sufficiently that it will sustain its configuration as the ring is assembled on the bowl 16. It is then removed from its mold and the openings 20 punched through the green clay of the ring, as is a vent opening 37 positioned to vent the space between the rings when they are fired.

In a similar manner, the mold for the air ring section 29 is filled with a liquid clay slip and allowed to harden inwardly of the mold by the withdrawal of moisture from the slip into the mold until a peripheral portion of predetermined desired thickness has hardened. The central liquid portion of the clay slip in such mold is then poured out of the opening defined by the air coupler 36 and the remaining material within the mold allowed to dry until the air ring section is of sufficient rigidity be removed from the mold and handled. The openings 30 are then punched through the green clay of the air ring.

The base and bowl portion of the section of the toilet is formed by providing a base and bowl mold which is filled with a clay slip which is allowed to harden sufficiently to permit handling of the bowl and base section.

When all three sections of the toilet have been so prepared, they are assembled by first positioning the water ring 18 on the bowl section 16. Preferably a clay slip is spread onto the top edge 17 of the bowl section so that a firm joint will be formed between the bowl sections 16 and the water ring 18 when the assembly is subsequently fired. Thereafter, the air ring 29 is positioned on the water ring, a light coating of clay slip being placed on the bottom surface 44 of the air ring and on the top surfaces of the ribs 33, 35. The vent opening 37 between the ribs 33, 35 permits the escape of air from between the ribs 33, 35 and assures that a firm bond will be provided between the air ring 29 and the ribs 33, 35. If such ribs were not present, it is possible that air pockets would be present between the bottom of the air ring and the top of the water ring when the units are assembled and which upon firing and the subsequent expansion of the air in such pockets would cause disruption of the bond between the two sections. It should be understood the use of projections, such as ribs 33, 35, to space parts to be fired apart to provide a vent channel is a known practice in the ceramic industry.

After assembly of the air, water, and bowl sections together, the outer surface of the assembly is sprayed with a coating of enamel glaze and the whole assembly thereafter fired to form a rigid integral structure utilizing skills known to the toilet making art.

Having illustrated a preferred embodiment of the invention it will be apparent that it permits of modification in arrangement and detail. We claim all such modifications as come within the scope and purview of the appended claims.

We claim:

1. In a method for making a toilet providing a first mold for a base and bowl section, said bowl section having a semi-elliptical top edge, slip casting a base and bowl section in said first mold, providing a semi-elliptical second mold of plaster of Paris for a first semi-elliptical rim section adapted to seat on said bowl section top edge, said first rim section defining a first passageway for the conduction of water and a water plenum communicating with said first passageway having an upper wall and a lower wall, said upper wall having upper and lower surfaces, said lower wall having upper and lower surfaces, said lower wall having an upstanding first rib engaging said upper wall lower surface, said second mold having a first cavity defining the exterior surface configuration of said first rim section and the lower surface of said lower wall and rib and the upper surface of said upper wall, and having an access opening to said first cavity, filling said second mold with a liquid clay slip and thereafter permitting the slip to harden a predetermined amount inwardly of said second mold by the withdrawal of moisture from said clay slip into said second mold while leaving the central portion of said clay slip in said second mold liquid, while said central portion of said clay slip is still liquid, removing said liquid central portion through said access opening thereby to leave a tubular wall defining said first passageway in said first rim section and said upper and lower walls and said rib, and thereafter permitting said clay slip to dry until said first rim section is of sufficient rigidity to be removed from said second mold and positioned on said bowl section top edge, removing said first rim section from said second mold and positioning said first rim section on said bowl top edge, providing a semi-elliptical third mold of plaster of Paris for a second semi-elliptical rim section adapted to seat on said first rim section, said second rim section defining a second passageway for the conduction of air and a collection chamber communicating with said second passageway having a lower wall having upper and lower surfaces, and an upper wall spaced from said collection chamber lower wall and having upper and lower surfaces and an upstanding second rib engaging said rim section upper wall, said third mold having a second cavity defining the exterior surface of said second rim section the upper surface of said second rim section upper wall and the lower surface of said second rim section lower wall and said second rib, and having an access opening to said second cavity, filling said third mold with a liquid clay slip and thereafter permitting the slip to harden a predetermined amount inwardly of said third mold by the withdrawal of moisture from said clay slip into said third mold while leaving the central portion of said clay slip in said third mold liquid, while said central portion of said clay slip in said third mold is still liquid, removing said liquid central portion through said access opening thereby to leave a tubular wall defining a passageway in said second rim section and said collection chamber upper and lower walls and said second rib, and thereafter permitting said clay slip in said third mold to dry until said second rim section is of sufficient rigidity to be removed from said third mold, removing said second rim section from said third mold and positioning said second rim section on said first rim section, and firing said assembled base and bowl section, first rim section and second rim section to bond the same together and form a composite rigid structure, said first rib supporting the said upper wall of said water plenum, said second rib supporting the said upper wall of said air collection chamber during said firing.

* * * * *

UNITED STATES PATENT AND TRADEMARK OFFICE
CERTIFICATE OF CORRECTION

PATENT NO.    : 6,019,862

DATED         : February 1, 2000

INVENTOR(S)   : Troy Cardwell and Scott Cardwell

It is certified that the following errors appear in the above-identified patent and that said Letters Patent is hereby corrected as shown below:

| Col./Line | | Should Read |
|---|---|---|
| 2 | though | through |
| 28/22 | portion; | portion, |
| 8/40 | rigidity be | rigidity to be |

Signed and Sealed this

Seventeenth Day of April, 2001

Attest:

NICHOLAS P. GODICI

*Attesting Officer*      *Acting Director of the United States Patent and Trademark Office*